United States Patent [19]
West

[11] Patent Number: 6,005,483
[45] Date of Patent: Dec. 21, 1999

[54] ELECTRONIC PUMP SWITCHING SYSTEM

[75] Inventor: David West, Marathon, Fla.

[73] Assignee: Anthony Rhulen, Rock Hill, N.Y.

[21] Appl. No.: 09/220,624

[22] Filed: Dec. 24, 1998

[51] Int. Cl.⁶ .................................................. G08B 21/00
[52] U.S. Cl. ........................... 340/618; 340/620; 340/612
[58] Field of Search ..................... 340/618, 620, 340/612, 309.15; 73/304 R, 304 C; 417/12

[56] References Cited

U.S. PATENT DOCUMENTS

| | | | |
|---|---|---|---|
| 4,341,178 | 7/1982 | Price | 114/183 R |
| 4,479,116 | 10/1984 | Kobayashi | 340/620 |
| 4,881,873 | 11/1989 | Smith et al. | 417/12 |
| 5,076,763 | 12/1991 | Anastos et al. | 417/44 |
| 5,220,514 | 6/1993 | John | 364/509 |
| 5,287,086 | 2/1994 | Gibb | 340/618 |
| 5,324,170 | 6/1994 | Anastos et al. | 417/12 |
| 5,506,564 | 4/1996 | Hargest | 340/450.2 |
| 5,545,012 | 8/1996 | Anastos et al. | 417/44.11 |
| 5,856,783 | 1/1999 | Gibb | 340/618 |

*Primary Examiner*—Jeffery A. Hofsass
*Assistant Examiner*—Sihong Huang
*Attorney, Agent, or Firm*—Schweitzer Cornman Gross & Bondell, LLP

[57] ABSTRACT

An electronic pump switching system comprises a water sensor coupled to a comparator which generates an output signal when water is sensed. The comparator output is coupled to a timer, which is initiated for a predetermined period by the comparator output signal. The timer is coupled to a switch which activates a coupled device, such as a pump, for the predetermined period. The continued presence of water at the sensor at the end of a predetermined period causes the timer to time a new predetermined period, whereby the coupled device remains activated. The sensor may be formed from a pair of electrodes arrayed as a voltage divider. The voltage divider action may additionally serve as a discriminator, allowing timer operation to be tied to the detection of water, as opposed to petroleum products, such as fuel.

6 Claims, 1 Drawing Sheet

ELECTRONIC PUMP SWITCHING SYSTEM

The present invention relates to an electronic pump switching system having particular utility as a watercraft bilge water sensing system.

BACKGROUND OF THE INVENTION

It is well known to provide watercraft with a pump apparatus for removing bilge water which accumulates in the craft. In its most simple embodiment, such a pumping system incorporates a pump connected through a switch to a power supply. When the bilge water sufficiently collects the switch is manually operated, the pump being operated until the water level is sufficiently lowered. The pump is then switched off. Alternatively, the pump may be provided with a float arrangement allowing some measure of automatic control to the system.

It is also known to provide an electronic sensing apparatus to automatically sense the presence of bilge water and operate the pump.

Often, the bilge water may be contaminated with fuel, which rises to the surface thereof. Activation of a pump in response to a rising level of fuel, rather than water, may have disastrous consequences.

In addition, the natural action of a vessel in responding to waves or swells can cause the bilge water to slop around, creating intermittent contact with sensor probes. Often, the probes are connected to a delay circuit, requiring continuity to be made for a preset length of time prior to pump actuation. In certain circumstances, due to wave action, the probes may not be activated for a sufficient amount of time, thus preventing proper pump action.

It is accordingly the purpose of the present invention to provide a bilge water pump control apparatus which insures a high degree of reliability and accuracy under a variety of operating conditions, and which is capable of distinguishing between the presence of bilge water and fuel.

BRIEF DESCRIPTION OF THE INVENTION

In furtherance of the foregoing and other objects and purposes, an electronic pump switching system adapted for use in bilge water control in accordance with the present invention includes a timer which activates a pump for a pre-determined interval. The timer is triggered by an input signal generated by a sensor which indicates the presence of a sufficient amount of bilge water for pump operation. The sensor may preferably include a pair of probes which are oriented and positioned for detection of the bilge water.

The timer is preferably triggered by an intermittent input representing a momentary appearance of water at the sensor. At the end of a timing interval the timer resets, such that the continued presence of an input signal can reinstitute subsequent timing intervals, allowing for continuous operation of the pump so long as water is sensed.

Distinguishing between water and fuel may be accomplished by an integral discriminator circuit which is responsive to the differences in conductivity between fuel and water. The elements of the switching system are preferably formed of CMOS-family semiconductors, allowing a system of high accuracy and low power requirements to be maintained.

BRIEF DESCRIPTION OF THE DRAWINGS

A fuller understanding of the present invention will be acquired upon consideration of the following detailed description of a preferred, but nonetheless illustrative embodiment of the invention, when reviewed in conjunction with the annexed drawing, wherein.

DETAILED DESCRIPTION OF THE INVENTION

Figure 1:
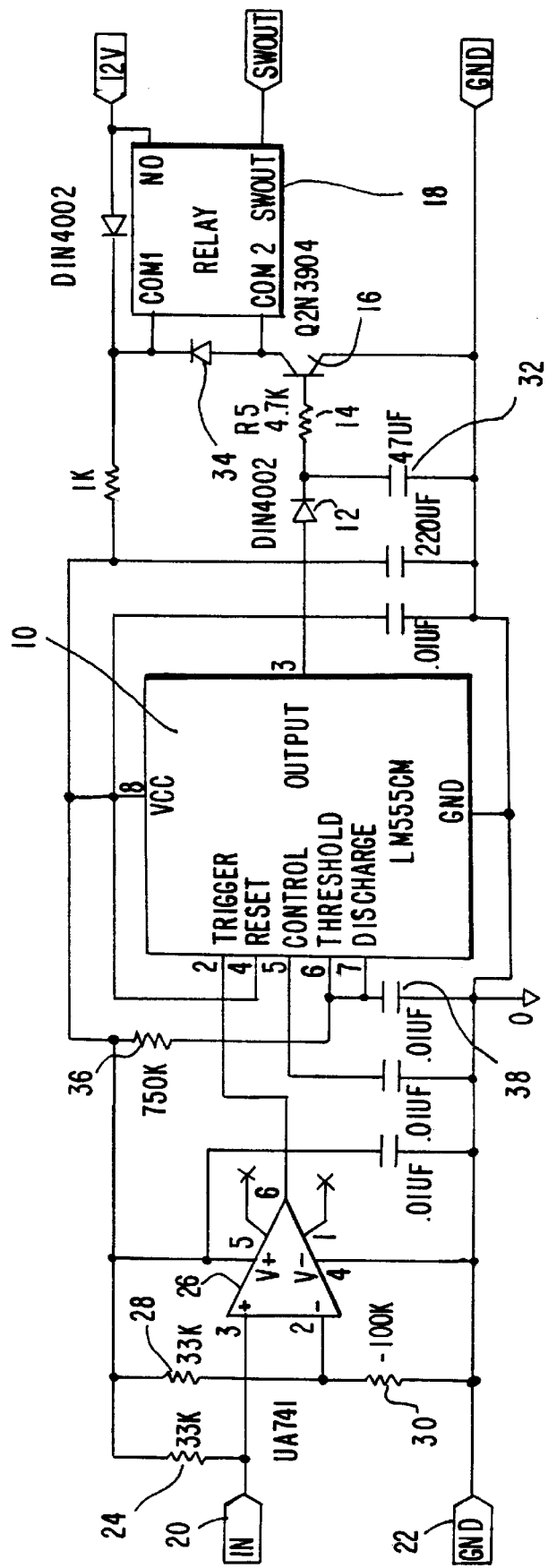
FIG. 1 is a schematic diagram of a circuit of the present invention.

As shown in FIG. 1, operation of a pump or other apparatus in response to the detection of water is controlled by timer 10, which generates an output at terminal 3, during the duration of which the pump is activated. The timer may preferably be of the LM555 integrated circuit type. As known in the art, such a timer is capable of providing a positive-going output at terminal 3 for a preset duration, as established by the combination of resistance 36 and capacitance 38 coupled to its terminals 6 and 7. The timer is enabled by the application of a negative-going trigger pulse at terminal 2. As shown in the FIGURE, timer 10 may be preferably configured to have a positive-going output for a duration of approximately 7.5 seconds.

The timer output is coupled through blocking diode 12 and resistor 14 to the base of switching transistor 16. The application of a positive voltage to the base of transistor 16 triggers the transistor, permitting current flow through its collector-emitter path. As the coil of relay 18 is in series with the collector emitter loop through relay terminals COM1 and COM2, activation of transistor 16 enables the relay for a commensurate period of time. A pump (or any other apparatus) connected between the switched output contact SWOUT of the relay and ground will thus be supplied with 12 volt power through the relay operation for the commensurate time period.

Sensing electrodes 20 and 22 are located to sense the presence of water, as in the bilge of a watercraft, and are positioned at an appropriate level for the desired water sensing. The electrodes are preferably of brass or similar non-corrosive metal. In conjunction with resistor 24, the electrodes form a voltage divider across positive input terminal 3 of comparator integrated circuit 26. As known in the art, the output of comparator 26 at terminal 6 is high when the voltage at positive input 3 exceeds the voltage at negative input 2. As depicted, the voltage divider composed of resistors 28 and 30 are chosen to place a voltage of approximately 9 volts at input terminal 2. Thus, the output at terminal 6 is high when the input applied to terminal 3 exceeds this 9 volt reference.

With electrodes 20 and 22 not submerged, the resistance therebetween is extremely high, and thus the voltage divider action of this resistance and resistor 24 applies a voltage to comparator terminal 3 of approximately 12 volts. As this voltage exceeds the 9 volt reference applied to reference terminal 2, the output of the comparator of terminal 6 is high and the timer remains inactive. When the electrodes are in contact with water, however, the conductivity of the water substantially decreases the resistance therebetween, causing the voltage appearing at terminal 3 to drop below 9 volts. As this occurs the output at terminal 6 drops to zero, this negative-going transition triggering timer 10 into operation. Output terminal 3 goes high for the time-out duration, activating switching transistor 16 and relay 18. For so long as the timer is active, voltage transitions and variations at timer input 2 have no effect on timer operation. Because the input voltages to comparator 26 are both tied to and derived from the same power line, fluctuations in voltage affect both voltages in a corresponding manner. Thus, it is not necessary to provide voltage stability components which might increase either cost or complexity of the system.

Timer 10 remains activated for the 7.5 second time period. If, at the end of the 7.5 second period the voltage at trigger terminal 2 has returned to the high voltage state, resulting from the water level dropping below the sensing level of the electrodes 20 and 22, the timer "times out", its output terminal dropping low, shutting off transistor 16 and thus turning off the pump. If, however, the water level is still sufficient to be in contact with the electrodes, the output of comparator 26 remains low, and timer 10 is immediately re-triggered for a new 7.5 second timing interval, maintaining the pump on for the corresponding period of time. Such re-triggering at the end of a timing cycle is repeated for so long as the electrodes detect the presence of water therebetween. Capacitor 32, located across the output of the timer through blocking diode 12, maintains transistor 16 in the on mode slightly beyond the turn-off of the timer. This prevents immediate release of relay 18, preventing interruption of power to the pump during the small interval of time that may exist between the end of a timing period and the start of a subsequent period. If the timer is not immediately restarted the capacitor quickly discharges through resistor 14 and transistor 16, allowing the transistor to turn off. Diode 34 placed across the coil of relay 18 helps dissipate back EMF effects which occur upon relay coil deenergization.

Preferably, electrodes 20 and 22 are spaced and configured to develop a resistance therebetween of approximately 100K ohms when water is present therebetween. This corresponds to an electrode spacing of approximately 1.25 inches. Because the resistance of petroleum products, and particularly fuels, such as gasoline, is higher than that of water, particularly sea water or water bearing impurities commonly present in bilges and the like, the comparator serves as a discriminator, allowing pump activation to be initiated only when water, as opposed to such a petroleum product, is sensed. As gasoline is immiscible with water and is of lesser density, as the liquid level drops to a point whose fuel, as opposed to water, is between the sensors, the pump is disengaged, similarly preventing the fuel from being removed from the bilge and improperly discharged.

The incorporation of timer 10 to control the pump also allows the present system to have faster response to rising or momentary water condition without risk of pump overheating. Because of wave action the electrodes may be subject to momentary or intermittent water contact as the bilge water slops. Since only a momentary sensing is required to initiate the timer, pumping can be started early on as the water level rises. Yet because water slop might result in water sensing when the water level is not actually sufficiently high to require pumping, the relatively short duration of pump operation results from any particular timer activation insures that, even if the pump were activated prematurely or inadvertently, the pump does not remain activated for a period which could result in pump damage.

As shown, the circuit of the present invention may be efficiently operated in a single-ended 12 volt power supply of the type typically encountered in watercraft. To avoid the necessity for a dual-ended power supply, the semiconductor components preferably utilize CMOS fabrication technology, which allows a low level output of comparator 26 for triggering purposes. Convention TTL (transistor-transistor-logic) circuitry would not provide a sufficiently low level output from a comparator circuit to assure accurate switching of timer 10. The circuitry, with the exception of the probes, may be encapsulated to provide protection against chemical, heat, and mechanical damage. The encapsulating material may be, for example, a polyurethane block. Appropriate connectors or cables may be provided to provide the necessary interconnection to the encapsulated components.

As may be appreciated by those skilled in the art, the present invention may be used in conjunction with the operation of other or additional devices besides pumps. For example, an audible or visual alarm may be enabled. In addition, while the invention has been depicted in connection with the operation of a pump which is to be powered by the same power supply driving the invention, it is not necessary that the controlled device be so driven. As known in the art, full isolation relays, either mechanical or solid-state, can be used to control devices having power requirements differing from that of the present invention.

I claim:

1. A water control system comprising a single-ended water sensor forming a voltage divider circuit between a direct current voltage source and ground; a voltage comparator having a first input directly coupled to said water sensor and a second input connected to a reference voltage signal; a timer having an input coupled to an output of said comparator for generating a timer output for a given fixed duration in response to the commencement of an output signal from said comparator corresponding to a transient sensing of water by said water sensor and the generation of a direct current potential at the first input corresponding to said transient sensing, said given fixed duration being independent of a duration of said sensing of water; and a switch coupled to the timer output and being activated for said given duration for controlling an apparatus connected to said switch.

2. A water control system of claim 1 wherein said fixed duration is about 7.5 seconds.

3. A water control system of claim 1 wherein said switch comprises a semiconductor switch and a relay.

4. A water control system of claim 3 further comprising means for maintaining said switch in an activated state for an additional time beyond the end of said fixed duration.

5. A water control system of claim 4 wherein said maintaining means comprise a capacitor coupled to the timer output.

6. The water control system of claim 1, wherein said water sensor comprises a discriminator for distinguishing between the presence of water and a petroleum product.

* * * * *